March 8, 1966 R. VOORHEES 3,239,438
METHOD AND APPARATUS FOR PURIFYING ELECTROLYTE
USED IN ELECTRO-CHEMICAL MACHINING
Filed May 21, 1962
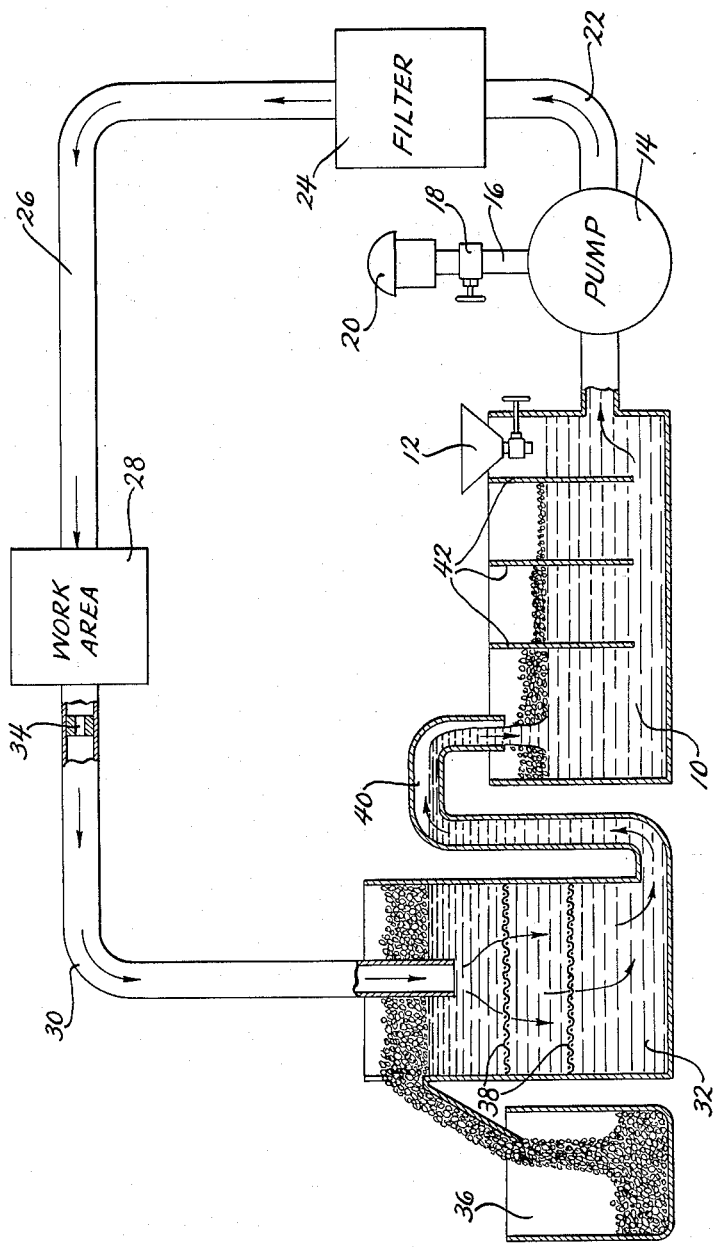
INVENTOR.
ROGER VOORHEES
BY
Bower & Patalidis
ATTORNEYS United States Patent Office 3,239,438
Patented Mar. 8, 1966

3,239,438
METHOD AND APPARATUS FOR PURIFYING ELECTROLYTE USED IN ELECTRO-CHEMICAL MACHINING
Roger Voorhees, Lima, Ohio, assignor to Ex-Cell-O Corporation, Detroit, Mich.
Filed May 21, 1962, Ser. No. 196,400
18 Claims. (Cl. 204—143)

This invention relates to a method and apparatus for purifying electrolyte solutions such as are used in the electrolytic shaping of a current conducting workpiece by an electrode tool.

Electrolytic machining, or electro-chemical machining as the process is sometimes called, is particularly well adapted for surface shaping and hole sinking in workpieces where ordinary machining methods would fail or would be difficult to be effected due to the hardness or brittleness of the material, the complicated shape to be obtained, or the obligation to avoid thermal and mechanical strain.

In electrolytic machining, generally a direct current of substantially low voltage is caused to flow between an electrode tool connected to the negative terminal and a workpiece connected to the positive terminal through an electrolyte solution which is pumped under pressure to the interface between the tool active face and the workpiece, the electrolyte solution being often introduced to the interface through a hollow portion of the electrode tool. The spacing between the electrode tool active face and the workpiece is very small, the rate of flow of electrolyte is important and high current densities are commonly used to effectuate adequate material removal from the workpiece.

The electrolyte solution generally consists of a salt or several salts in solution in water, the type of electrolyte being determined by the composition of the electrode tool, the composition of the workpiece and the kind of finish to be obtained on the shaped article. The electrolyte may be neutral, or acid, or alkalized. Neutral electrolytes often present many advantages, the most important of which is reduced chemical attack of the tool, the workpiece and the equipment, but some material dislodged from the workpiece is insoluble in the electrolyte and remains suspended as solid impurity particles. In spite of the high rate of electrolyte flow in the tool-workpiece interface, some of these particles, not removed by ordinary filtering systems, precipitate on or adhere to the electrode tool and the workpiece. They deteriorate the tool face, cause surface defaults on the workpiece and often, by establishing a shorting path between the tool and the workpiece, may result in damaging arcing or short circuits occurring between the electrode tool active face and the workpiece.

The invention provides a novel process and apparatus which is capable of removing the insoluble impurity particles in suspension in an electrolyte solution. The invention presents substantial advantages principally, although not exclusively, in electrolytic machining operations using neutral electrolyte solutions. The teachings of the invention can be adapted without much cost or added complication to electro-chemical processes and apparatus already in service.

Other objects and advantages will become apparent from the following description of an embodiment of the invention as illustrated in the accompanying drawing in which:

The unique figure represents a schematic electrolyte flow diagram for an electrolytic machining apparatus, said flow diagram illustrating the principles of the invention.

Referring now to the drawing, the electrolyte solution contained in a reservoir 10 open to the atmosphere is charged with a foaming agent, which may be ordinary soap in liquid or powder form, by way of a dispensing device 12. The electrolyte solution is drawn from the reservoir 10 by a pump 14 which pressurizes the electrolyte to a pressure of several atmospheres, preferably above 25 p.s.i. A gaseous fluid, such as ordinary atmospheric air, is simultaneously introduced into the electrolyte by means of a conduit 16. The amount of gaseous fluid is regulated by a valve 18, and, where ordinary air is used, it is best to filter the air such as by means of an air filter 20.

The outlet of the pump 14 may be connected by means of a conduit 22 to a filter 24. As explained hereinafter, filter 24 is not absolutely necessary and may be bypassed or entirely omitted. The outlet of the filter 24, when such a filter is used, is connected via a conduit 26 to the work area 28 in which the electrolytic machining of a workpiece is effected by means of an electrode tool (not shown), the electrolyte flow being directed to the interface between the workpiece and the electrode tool. The work area is preferably surrounded by an enclosure, or work box, preferably made of transparent material, such as plexiglass which is corrosion resistant, pressure resistant and which enables the operator to observe the machining operation.

From the work area or enclosure 28 the electrolyte is allowed to flow by way of a conduit 30 to another reservoir 32, which may be an integral but separate portion of reservoir 10, also open to the atmosphere. A restriction 34 is disposed proximate to the electrolyte flow outlet from the work area or enclosure 28 in order to maintain the electrolyte solution at a substantial pressure while in the interface between the workpiece and the electrode tool. The electrolyte solution, flowing at atmospheric pressure into the reservoir 32, effervesces, due to the escape of the gaseous fluid precedently added to the solution to which is added the action of gases, such as hydrogen, which have been generated during the electrolyzing operation and which were prevented from escaping by the high pressure extent in the work area or enclosure. Bubbles form at the surface of the electrolyte in reservoir 32, the surface tension of the bubbles being greatly increased by the action of the foaming agent precedently added to the electrolyte solution, and the foam thus forming is allowed to overflow by gravity into a tank or receptacle 36 where it accumulates. This foam contains practically all the impurity solid particles such as oxides and hydroxides of the workpiece metals, formed during the electrolyzing operation and which, being insoluble in the electrolyte solution, had remained suspended therein.

Perforated screen baffles 38 may be horizontally disposed in the reservoir 32 in order to slow down the flow of electrolyte and to contribute to the formation of the foam. The electrolyte solution is drawn from the bottom of the reservoir 32 and overflows by gravity, by means of an overflow pipe 40, into the top of the reservoir 10. Solid vertical baffles 42 may be disposed in the reservoir 10, extending from above the surface of the electrolyte to a distance short of the bottom of the reservoir, thus forcing the electrolyte to flow the baffles and defining compartments preventing any foam which had remained suspended in the electrolyte or which may form, due to the agitation of the solution in the reservoir 10, from being carried away by the flow of the electrolyte.

It has been found experimentally that the foam contains practically all the objectionable solid particles in suspension in the electrolyte solution. The theory by which such a purifying process takes place is not entirely understood, but it is significant to observe that no purifying action takes place except when the workpiece is actually being eroded away by the electrolytic process in the work area. "Dirty" electrolyte has been circulated, with addition of foaming agent and gaseous fluid, as hereinbefore described, but without any electrolyzing operation being effected in the work area, and no separation of impurity particles from the electrolyte solution occurred. It seems, therefore, that the separation and purifying phenomenon is an integral part of the electrolytic process and that the electro-chemical action during electrolyzing of a workpiece creates an electrostatic effect, or some other electrical effect, which is necessary for the purifying action to take place.

The separation of solid particles from the solution is so effective that the filter 24 has been found to be entirely unnecessary and may be dispensed with. The filter may however be left in the apparatus as a precautionary measure only, to remove particles that would remain suspended in the electrolyte in the event that the operator would forget to add the foaming agent to the solution, or in the event that the supply of foaming agent would become exhausted without the operator's knowledge.

It is to be understood that the foaming agent may be added to the electrolyte solution in reservoir 32 as well as in reservoir 10, although it is more practical to add it to the electrolyte in reservoir 10. It is also to be understood that many means can be used for removing the foam from the surface of the electrolyte in reservoir 32, such as blowing the foam into a receptacle by means of an air blast, or sucking it by means of a suction apparatus, as well as using natural gravity, as herein described by way of example. A foam conveyor, or a rake, or a vibrating inclined chute could also be used.

Having thus described the invention by way of example, and being obvious to those skilled in the art that many changes, additions and omissions in the method and apparatus may be made without departing from the scope and spirit of the invention, what is claimed as new and useful and desired to be secured by Letters Patent is:

1. A method of purifying electrolyte used in a process of controlled electrolytic eroding of material from an electric current conducting workpiece by means of an electric current conducting electrode tool, said method comprising the steps of:
   adding a foaming agent to the electrolyte;
   pressurizing the electrolyte by means of a pump;
   introducing a gaseous fluid into said pressurized electrolyte;
   supplying the pressurized electrolyte to a work area where the controlled electrolytic eroding of material from said workpiece takes place through the flow of electric current across the interface between the electrode tool and the workpiece;
   maintaining the electrolyte under substantial pressure while in the interface;
   letting the electrolyte flow by gravity after it escapes from the work area through conduit means leading to the top of a first reservoir open to the atmosphere;
   allowing the electrolyte to effervesce at atmospheric pressure whereby a foam in which are entrapped suspended particles formed during the electrolytic eroding of material from the workpiece is floated to the surface of the electrolyte in said first reservoir;
   causing the foam to overflow into a foam receptacle;
   causing the electrolyte to be drawn from the bottom of the first reservoir and to overflow into a second reservoir also open to the atmosphere;
   and adding the foaming agent to the electrolyte in said second reservoir.

2. The method of claim 1 further comprising the added step of forcing the electrolyte through a filter element placed between the pump and the work area.

3. The method of claim 1 further comprising the added step of causing the electrolyte to flow through a plurality of screen baffles horizontally disposed in the first reservoir to increase the formation of foam.

4. The method of claim 1 wherein the gaseous fluid is atmospheric air.

5. The method of claim 1 wherein the foaming agent is ordinary soap detergent.

6. In a process of removing material from a workpiece by electrolytic action at the interface between a workpiece and the working face of an electrode tool, the method for removing impurity particles suspended in the electrolyte comprising the steps of:
   adding a foaming agent to the electrolyte;
   pressurizing the electrolyte to a pressure of several atmospheres;
   contemporaneously adding a gaseous fluid to the electrolyte;
   supplying the pressurized electrolyte to the interface between the workpiece and the working face of the electrode tool;
   maintaining the electrolyte under substantial pressure while in the interface;
   drawing the electrolyte from the interface to a first reservoir where the electrolyte is allowed to effervesce at reduced pressure and form a foam containing the impurity particles;
   allowing the impurity particles containing foam to be drawn from the first reservoir into a foam receptacle;
   allowing the electrolyte to flow from the bottom of said reservoir to the top of a second reservoir;
   and adding the foaming agent to the electrolyte in said second reservoir.

7. The method comprising the steps of claim 6 with the added step of forcing the electrolyte to be drawn through screen baffles disposed horizontally in the first reservoir, thereby increasing the formation and floatation of foam.

8. The method comprising the steps of claim 6 with the added step of forcing the electrolyte to flow under baffles disposed vertically in the second reservoir, thereby causing any foam that was not entrapped in the first reservoir to be forced to the surface of said second reservoir and be stopped by said baffles.

9. The method of claim 6 wherein the foaming agent is ordinary soap detergent.

10. An apparatus for purifying electrolyte containing impurity solid particles generated during electrolytic machining of a workpiece by means of an electrode tool, said apparatus comprising:
    means adding a foaming agent to the electrolyte;
    pressurizing means placing the electrolyte under a pressure of several atmospheres;
    means adding a gaseous fluid to the electrolyte;
    means supplying the electrolyte to the interface between the workpiece and the electrode tool;
    means maintaining the electrolyte under pressure when in the interface;
    a first reservoir open to the atmosphere;
    means for collecting the electrolyte escaping from the interface and returning said electrolyte to the first reservoir where the electrolyte is allowed to effervesce at atmospheric pressure whereby a foam is formed on the surface thereof, said foam containing the impurity solid particles;
    means directing the foam into a foam receptacle;
    means drawing the electrolyte from the bottom of the first reservoir to cause said electrolyte to overflow to a second reservoir also open to the atmosphere;
    and means adding the foaming agent to the electrolyte in said second reservoir.

11. The apparatus of claim 10 wherein a filter element is placed between the pump and the interface between the workpiece and the tool.

12. The apparatus of claim 10 wherein screen baffles are horizontally disposed in the first reservoir to increase the formation of foam.

13. The apparatus of claim 10 wherein said baffles are vertically disposed in the second reservoir and extend from above the surface of the electrolyte in said reservoir to a distance short of the bottom of said reservoir to cause the electrolyte to flow under the baffles, while any foam that may have been entrained by the electrolyte from the first to the second reservoir is thereby allowed to float to the surface of the compartments thus defined by the baffles and is prevented from remaining suspended in the electrolyte.

14. In an apparatus for removing material from a workpiece by electrolytic action at the interface between a workpiece and the working face of an electrode tool, the combination comprising:
  means adding a foaming agent to the electrolyte;
  means pressurizing the electrolyte to a pressure of several atmospheres;
  means contemporaneously adding a gaseous fluid to the electrolyte;
  means supplying the pressurized electrolyte to the interface between the workpiece and the working face of the electrode tool;
  means maintaining the electrolyte under substantial pressure while in the interface;
  means drawing the electrolyte from the interface to a first reservoir where the electrolyte is allowed to effervesce at reduced pressure and form a foam containing impurity solid particles formed during the electrolytic action at the interface and suspended in the electrolyte;
  means causing the impurity particles containing foam to be drawn from the first reservoir into a foam receptacle;
  means forcing the electrolyte to flow from the bottom of said reservoir to the top of a second reservoir;
  and means adding the foaming agent to the electrolyte in said second reservoir.

15. The apparatus of claim 14 wherein the electrolyte is drawn through screen baffles disposed horizontally in the first reservoir, thereby increasing the formation and floatation of foam.

16. The apparatus of claim 14 wherein the electrolyte is forced to flow under baffles disposed vertically in the second reservoir, thereby causing any foam that was not entrapped in the first reservoir to be forced to the surface of said second reservoir and be stopped by said baffles.

17. In a process of removing material from a workpiece by electrolytic action at the interface between a workpiece and the working face of an electrode tool, the method for removing impurity particles suspended in the electrolyte comprising the steps of:
  adding a foaming agent to the electrolyte;
  pressurizing the electrolyte;
  adding a gaseous fluid to the electrolyte;
  supplying the pressurized electrolyte into the interface between the workpiece and the working face of the electrode tool;
  maintaining the electrolyte under substantial pressure while in the interface;
  drawing the electrolyte from the interface to a reservoir where the electrolyte is allowed to effervesce at reduced pressure and form a foam containing the impurity particles;
  and drawing the impurity particles containing foam into a separate receptacle.

18. In an apparatus for removing material from a workpiece by electrolytic action at the interface between a workpiece and the working face of an electrode tool, the combination comprising:
  means adding a foaming agent to the electrolyte;
  means pressurizing the electrolyte;
  means adding a gaseous fluid to the electrolyte;
  means supplying the pressurized electrolyte to the interface between the workpiece and the working face of the electrode tool;
  means maintaining the electrolyte under substantial pressure while in the interface;
  means drawing the electrolyte from the interface to a reservoir where the electrolyte is allowed to effervesce at reduced pressure and form a foam containing impurity solid particles formed during the electrolytic action at the interface and suspended in the electrolyte;
  and means drawing the impurity particles containing foam into a separate receptacle.

References Cited by the Examiner

UNITED STATES PATENTS

| 2,895,814 | 7/1959 | Clark | 204—143 |
| 2,939,825 | 6/1960 | Faust et al. | 204—143 |

FOREIGN PATENTS

| 335,003 | 9/1960 | Great Britain. |

JOHN H. MACK, *Primary Examiner.*